United States Patent [19]

Cassella et al.

[11] 4,200,528
[45] Apr. 29, 1980

[54] REMOVING METAL IONS FROM AQUEOUS EFFLUENTS

[75] Inventors: Vincent J. Cassella, Crystal Lake, Ill.; Mazin R. Irani, King of Prussia, Pa.

[73] Assignee: PQ Corporation, Valley Forge, Pa.

[21] Appl. No.: 968,938

[22] Filed: Dec. 13, 1978

Related U.S. Application Data

[63] Continuation-in-part of Ser. No. 891,232, Mar. 29, 1978, abandoned.

[51] Int. Cl.$^2$ .......................... C02B 1/20; C02C 5/02
[52] U.S. Cl. ........................................ 210/49; 210/51; 210/DIG. 30
[58] Field of Search ............ 8/94.27; 210/38 B, 42 R, 210/45, 47, 49, 51, 59, 60, DIG. 30

[56] References Cited

U.S. PATENT DOCUMENTS

| | | | |
|---|---|---|---|
| 3,766,036 | 10/1973 | McKaveney | 210/42 R |
| 3,928,195 | 12/1975 | Hoeltgen et al. | 210/49 |
| 4,012,320 | 3/1977 | Conner et al. | 210/45 |

FOREIGN PATENT DOCUMENTS

| | | | |
|---|---|---|---|
| 46-23491 | 7/1971 | Japan | 210/DIG. 30 |
| 50-8265 | 4/1975 | Japan | 210/DIG. 30 |
| 51-1362 | 1/1976 | Japan | 210/10 |
| 52-10097 | 3/1977 | Japan | 210/DIG. 30 |

*Primary Examiner*—Thomas G. Wyse
*Attorney, Agent, or Firm*—E. G. Posner; J. Stephen Bobb; F. C. Philpitt

[57] ABSTRACT

Amorphous, hydrated magnesium silicate is effective in reducing the concentration of various metal ions in aqueous solutions or effluent streams. Both mono- and multi-valent ions can be treated in this manner thereby providing a method of preventing release of metal ions to the environment. The method is especially efficient in removal of chrome values from effluents generated in chrome tanning operations. Efficient adsorption of the chrome requires that the pH of the effluent-magnesium silicate slurry be adjusted to or maintained at a value between 5.3 and 9.8. The chrome value may be recovered from the magnesium silicate by acidification of the complex.

16 Claims, 1 Drawing Figure

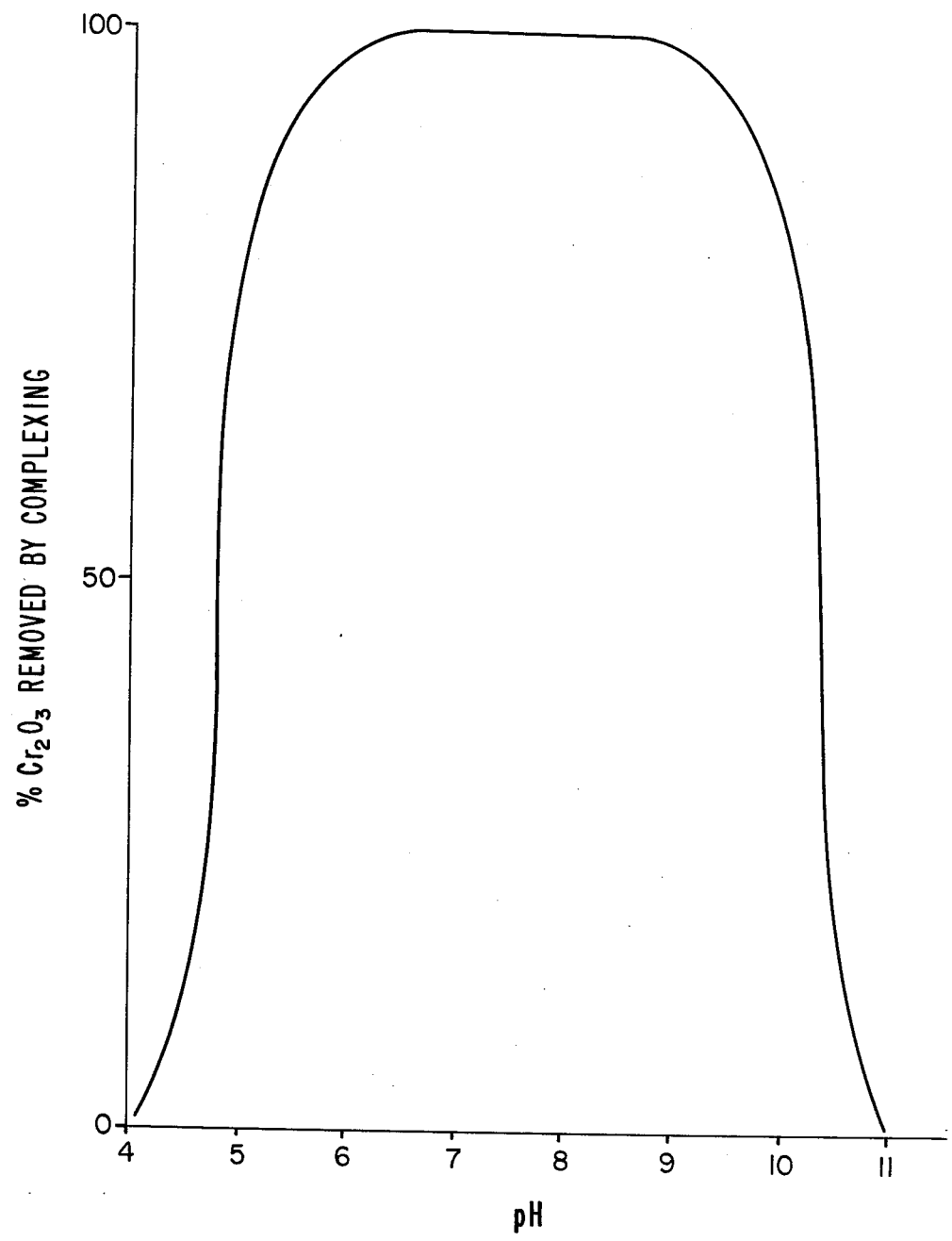

REMOVING METAL IONS FROM AQUEOUS EFFLUENTS

This application is a continuation-in-part of our co-pending application Ser. No. 891,232 which was filed on Mar. 29, 1978, now abandoned.

BACKGROUND OF THE INVENTION

This invention generally relates to the treatment of largely aqueous effluents. In particular, it provides a method for removing various metal ions before waste effluents are released to the environment. Most particularly, the invention relates to removing and recovering chrome values from tanning effluents.

The aqueous effluents of many industries contain numerous metal ions. In the past, these wastes have been discharged to the environment with attendent harmful effects. Certain procedures are possible in treating such effluents. Ion exchange resins and zeolites might be used to remove the metal ions. Both of these materials are expensive and require large amounts of water, chemicals and energy for regeneration.

The treatment of animal hides by various chemical methods to produce leather requires the use of large amounts of water. Some efforts are made to recycle the water, but eventually, it must be discharged into the environment. Most tanneries employ chromium salts as tanning agents so that a major effluent contaminant is tri-valent chromium, usually called chrome. It is desirable to remove the chrome values from the effluent and preferably in a manner that they can be recovered easily.

In preparing this application, the fields of tanning, waste water treatment and adsorption by magnesium silicate were considered and searched. No relevant references were discovered, thereby no prior art references were considered in drafting this application.

BRIEF DESCRIPTION OF THE DRAWING

The drawing is a graphical representation of removal of chromium ion (calculated as chromium oxide) from tannery effluent using magnesium silicate as a function of the pH of the effluent-magnesium silicate slurry.

SUMMARY OF THE INVENTION

Amorphous, hydrated magnesium silicate is mixed with aqueous effluent such as those of a chrome tannery. The slurry of magnesium silicate in the effluent is heated and/or adjusted in pH if desired. The metal ions (90% or more) are complexed by the silicate and effectively removed from the effluent by filtering off the silicate. The slurry of silicate and chrome tanning effluent is adjusted to and/or maintained at a pH of 5.3 to 9.8 to attain more than 90% removal of tri-valent chromium ions. Large proportions of the complexed metal ions can be recovered by acid treatment of the filtered material.

THE INVENTION

An amorphous highly hydrated, porous magnesium silicate is required for the process of our invention. Such materials can be prepared by the interaction of soluble magnesium salts and alkali metal silicate or by the interaction of magnesium hydroxide, an acid and alkali metal silicate. Other methods of preparation may also lead to useful materials provided the products have the required composition and properties, which are summarized in Table I.

TABLE I

| | |
|---|---|
| Mole Ratio ($SiO_2/MgO$) | 1.75 to 4.50 |
| Average Particle Size (microns) | 10 to 55 |
| Surface Area ($m^2/g$) | >30 |
| Bulk Density, Tamped (g/cc) | 0.40 to 0.75 |
| Weight Loss at 105° C. (wt. %) | 5 to 15 |
| Ignition Loss (wt. %) | 10 to 30 |

We prefer the magnesium silicate to have a surface area between 35 and 65 $m^2/g$. The useful silicate is white, free-flowing, insoluble in water, and easily filtered from or settles in aqueous suspensions. The proper balance of particle size surface area and bulk density indicated in Table I are important to provide adsorptivity and filterability. Crystalline magnesium silicates and amorphous materials with low water content do not seem to interact with the aqueous medium to provide complexing of the metal ions.

The hydrated magnesium silicate has been found effective in removing mono- and multi-valent metal ions from solutions and effluents. The mono-valent ions include the alkali metals such as sodium, potassium and lithium. The multi-valent ions include divalent cadmium, lead, copper and manganese. The silicate is equally efficient at removing tri-valent chromium and iron. Several divalent ions are adsorbed only to a limited degree and large amounts of magnesium silicate applied at optimum conditions (discussed hereinafter) may be necessary to effect efficient removal of these metal ions which include divalent cobalt, iron, nickel and zinc. No consistent theory or explanation appears to govern the behavior of magnesium silicate in complexing metal ions.

There are several factors that influence the performance of hydrated magnesium silicate in complexing and removing metal ions from solution. A surprising result or behavior is that increasing the temperature enhances the removal of metal ions by magnesium silicate. At room temperature, it might require up to 5% of the silicate and a 30 minute contact time to remove 99% of a metal ion from solution. At 50° C. and above it is possible to remove 99% of trivalent iron and divalent copper ions with only 1% silicate and a contact time of 30 minutes. These results (which are further illustrated in the Examples) are dramatic and unexpected. The expected behavior under these circumstances would be for reduced removal at increased temperatures since the metals would be more soluble and the equilibrium would move in the direction of the metal ion rather than toward the metal magnesium silicate complex, which can be filtered from the effluent. The temperature of the effluent should not be raised above about 95° C. to prevent excess evaporation.

The contact time between the magnesium silicate and the metal ion in solution influences the amount of metal ions complexed. As might be expected longer contact times result in a greater degree of complexing and greater removal of the metallic species. For example, a solution containing trivalent iron treated with 1% of hydrated magnesium silicate contained 990 ppm at 0 contact time, 421 ppm at 15 minutes and 32 ppm at 30 minutes. In some cases, virtually complete removals are accomplished in surprisingly short contact times. When 5% of the hydrated silicate is mixed with a solution containing about 1000 ppm of trivalent iron or divalent copper ions removal of 99% or more of the metal ions was realized in less than 5 minutes. Further illustration of these relationships will be found in the Examples, but it appears that contact times can be very short, less than 5 minutes.

The quantity of magnesium silicate has a large influence on the complexing and removal of metal ions from solution. The amount influences both the rates and completeness of the complexing, but depends to a degree on the concentration and variety of metal ions to be treated. We have found that 0.5 to 2.0 parts by weight (pbw) of magnesium silicate can complex 1 pbw of metal ion calculated as the metal oxide. Effective dosages have been found to be from 0.1 to 5.0% by weight of hydrated magnesium silicate based on the weight of the effluent for concentrations up to 1000 ppm of the metal ions.

The pH of the effluent increases when the magnesium silicate is added and it does appear that the pH must be above a certain level to provide substantial complexing and removal. This threshold pH value differs for each ion species. The lowest threshold value appears to be for trivalent iron. These effluents must have a pH value above about 2.5 before significant removal of iron is seen. Considering this fact it appears that the effluent or solutions should be adjusted to and maintained at a pH above 2.5. Too much alkali also destroys the complex since it attacks the silicate particle to form ionic silica, therefore, and pH should not be raised above about 11. Further indication of the role of the pH in this process is provided in the Examples and the more detailed discussion of the trivalent chromium ion system.

Aqueous effluents containing mono- or multi-valent metal ions can be treated as follows to complex and remove the metals. The effluent is agitated and heated if desired or necessary. The magnesium silicate and a pH controlling substance, if required, are added to the effluent. Sufficient of the pH controlling material (acid, base or buffer) is added to adjust and maintain the pH of the mixture in a pH region wherein a metal magnesium silicate complex forms. Sufficient magnesium silicate is used to complex the metal ions present to the degree desired, usually the lowest concentration possible. Mixing and contact between the silicate and effluent is continued for a time which is sifficient to form the metal magnesium silicate complex. The complexed metal is then separated from the effluent by filtering or centrifuging.

The metal ions can be recovered from the complex by treatment with strong acids.

One important application of the process of our invention is the removal of trivalent chromium ions from tannery effluent. This procedure is carried out as follows. The magnesium silicate and a pH controlling substance (an acid, base or buffer) are added to the agitating chromium containing effluent. The mixing was continued for 1 to 10 minutes. The silicate was filtered or allowed to settle and separated from the effluent. We have found that 0.5 to 1.5 parts by weight (pbw) of magnesium silicate effectively adsorbs 1 pbw chromium ion expressed as $Cr_2O_3$. Effective dosages have ranged from 0.1 to 5.0% based on the weight of the effluent. We prefer to use magnesium silicate at about 0.2 to 0.6% by weight of the effluent weight.

The amount of chrome removed from the effluent and complexed by the magnesium silicate is dependent upon the pH. The amount of chrome removed can be calculated using the emperically derived equation:

$$\% \text{ chrome removed} = (100\ KH)/(L+KH)$$

wherein log of $K = -26.15 + 8.89\ pH - 0.52(pH)^2$ and $H = \text{antilog}(-pH) = H + \text{concentration}$. FIG. I graphically represents this equation derived from the data determined using 0.50% magnesium silicate. From this graph, it can be easily seen that total removal of chrome can be effected by carrying out the complexing reaction between 6.5 and 8.5. pH adjustments between 5.3 and 9.8 result in complexing of 90% or more of the chrome in the effluent, while 80% or more is removed between 5.0 and 10.1 pH.

EXAMPLES

The following Examples illustrate certain embodiments of our invention and should not be considered as limiting to the scope of our invention. The limitations and scope of our invention is fully described and defined in the specification and claims. All proportions are in parts by weight (pbw), weight percent (%) or parts per million on a weight basis (ppm), unless otherwise stated.

EXAMPLE 1

A tannery effluent containing 220 ppm of chromium ion calculated as $Cr_2O_3$ was treated with 0.25% and 0.50% magnesium silicate with a mole ratio of $SiO_2/MgO$ of 2.5, average particle size $30\mu$, a surface area of 50 $m^2/g$ and a bulk density of 0.56 g/cc, a weight loss at 105 of 12% and an ignition loss of 23%. The pH of the slurry with 0.25% magnesium silicate was maintained at 7.0 while the slurry with 0.50% magnesium silicate had a pH of 7.7. Both slurries settled easily and the chrome was removed. The effluent treated with 0.25% silicate contained about 22 ppm of $Cr_2O_3$ while that treated with 0.50% contained less than 20 ppm.

EXAMPLE 2

The same tannery effluent described in Example 1 was treated with 0.25 and 0.5% of the magnesium silicate described in Example 1, but the pH was 10.4 and 9.9, respectively. After filtering, the effluents contained 155 ppm and 120 ppm $Cr_2O_3$, respectively.

EXAMPLE 3

This Example demonstrates the complexing of various metals with various dosages of the hydrated magnesium silicate described in Example 1. It also provides an indication of the pH relationships which is more fully developed for chromium and illustrated fully in the drawing. Solutions of various metals were prepared at about 1000 ppm of the metal ion. The chloride salts were used except for trivalent iron which was the sulfate. The solutions were stirred and the hydrated magnesium silicate added. The temperature was 22° C. and stirring was continued for 30 minutes. Then, the solutions were filtered and the filtrates analyzed for the subject ion. The pH values were measured before filtration. Table II summarizes the results.

TABLE II
COMPLEXING AND REMOVAL OF VARIOUS METAL IONS BY HYDRATED MAGNESIUM SILICATE

| Ion Removed | $Co^{+2}$ | | $Cd^{+2}$ | | $Cu^{+2}$ | | $Fe^{+2}$ | |
|---|---|---|---|---|---|---|---|---|
| Magnesium Silicate Dosage (%) | pH | $Co^{+2}$ Remaining (ppm) | pH | $Cd^{+2}$ Remaining (ppm) | pH | $Cu^{+2}$ Remaining (ppm) | pH | $Fe^{+2}$ Remaining (ppm) |
| 0.00 | 6.68 | 1100 | 6.85 | 980 | 4.61 | 1100 | 3.79 | 1040 |
| 0.10 | 7.54 | 960 | 7.68 | 900 | 4.78 | 960 | 5.19 | 900 |
| 0.25 | 7.64 | 9 × 60 | 7.74 | 780 | 4.77 | 910 | 5.32 | 780 |
| 0.50 | 7.73 | 8 × 60 | 7.80 | 680 | 4.82 | 750 | 5.37 | 680 |
| 1.0 | 7.75 | 800 | 7.92 | 400 | 4.91 | 530 | 5.98 | 680 |
| 5.0 | 8.17 | 140 | 9.27 | 1.4 | 8.24 | 0.1 | 7.60 | 40 |

| Ion Removed | $Fe^{+3}$ | | $Ni^{+2}$ | | $Zn^{+2}$ | | $Mn^{+2}$ | | $Pb^{+2}$ | |
|---|---|---|---|---|---|---|---|---|---|---|
| Magnesium Silicate Dosage (%) | pH | $Fe^{+3}$ Remaining (ppm) | pH | $Ni^{+2}$ Remaining (ppm) | pH | $Zn^{+2}$ Remaining (ppm) | pH | $Mn^{+2}$ Remaining (ppm) | pH | $Pb^{+2}$ Remaining (ppm) |
| 0.00 | 2.40 | 1040 | 5.92 | 1000 | 6.20 | 1000 | 7.0 | 1042 | 5.2 | 1052 |
| 0.10 | 2.49 | 920 | 7.58 | 990 | 6.90 | 960 | — | — | — | — |
| 0.25 | 2.56 | 780 | 7.65 | 990 | 7.10 | 860 | — | — | — | — |
| 0.50 | 2.62 | 560 | 7.69 | 820 | 7.16 | 800 | 7.8 | 863 | 6.2 | 320 |
| 1.0 | 3.04 | 26 | 7.73 | 790 | 7.19 | 720 | 8.1 | 819 | 7.7 | 5.2 |
| 5.0 | 7.41 | 0.3 | 8.12 | 160 | 7.65 | 63 | 8.6 | 345 | 9.9 | <0.5 |

EXAMPLE 4

This Example illustrates the effect of temperature upon the complexing of various metal ions by magnesium silicate. The chloride salts of 4 metals were prepared at about 1000 ppm of the ion. These were contacted with 1% of the magnesium silicate described in Example 1 for 30 minutes at the temperatures indicated. The mixtures were filtered and analyzed for metal ion content. The results are summarized in Table III.

TABLE III
COMPLEXING AND REMOVAL OF VARIOUS METAL IONS BY 1% HYDRATED MAGNESIUM SILICATE AS A FUNCTION OF TEMPERATURE

| Ion Removed | $Cr^{+3}$ | $Cd^{+2}$ | $Cu^{+2}$ | $Fe^{+3}$ |
|---|---|---|---|---|
| Original Conc. (ppm) | 1000 | 910 | 900 | 980 |
| Temp. (°C.) | | | | |
| 5 | 1000 | 420 | 600 | 930 |
| 22 | 960 | 410 | 550 | 260 |
| 50 | 680 | 340 | <0.1 | 0.3 |
| 75 | <0.1 | 280 | <0.1 | <0.08 |

These results indicate clearly that the complexing and removal of metal ions is directly proportional to the temperature at which contact is made.

EXAMPLE 5

This Example shows the effect of contact time on the complexing and removal of metal ions by magnesium silicate. Chloride salts of the metals were dissolved to provide solutions that contained. These were contacted with 1% or 5% of the magnesium silicate described in Example 1 at 22° C. After the desired contact time, a portion of the mixture was filtered and analyzed for the remaining metal ions. The results obtained with 1% and 5% magnesium silicate are summarized in Tables IV and V, respectively.

TABLE IV
COMPLEXING AND REMOVAL OF METAL IONS BY MAGNESIUM SILICATE AS A FUNCTION OF CONTACT TIME (1% MAGNESIUM SILICATE)

| Ion Removed | $Fe^{+3}$ (ppm) | $Cd^{+2}$ (ppm) | $Cu^{+2}$ (ppm) |
|---|---|---|---|
| Contact Time (min.) | | | |
| 0 | 999 | 910 | 900 |
| 5 | 930 | 534 | 610 |
| 10 | 660 | 506 | 590 |
| 20 | 278 | 490 | 540 |
| 30 | 32 | 456 | 490 |

TABLE V
COMPLEXING AND REMOVAL OF METAL IONS BY MAGNESIUM SILICATE AS A FUNCTION OF CONTACT TIME (5% MAGNESIUM SILICATE)

| Ion Removed | $Fe^{+3}$ (ppm) | $Cd^{+2}$ (ppm) | $Cu^{+2}$ (ppm) |
|---|---|---|---|
| Contact Time (min.) | | | |
| 0 | 999 | 910 | 900 |
| 5 | <0.1 | 19 | <0.1 |
| 10 | <0.1 | 5.5 | <0.1 |
| 20 | <0.1 | 2.7 | <0.1 |
| 30 | <0.1 | 1.9 | <0.1 |

These results show that the amount of metal ions complexed and removed from effluents is directly proportioned to the contact time. In addition, the results indicate that both the rate and completeness of removal is proportioned to the amount of magnesium silicate used.

We claim:

1. A method for removing metal ions from aqueous effluents comprising the steps of adding amorphous, hydrated magnesium silicate while adjusting or maintaining the pH in a region that favors the formation of an insoluble metal-magnesium silicate complex to agitating aqueous effluent; agitating the effluent-magnesium silicate mixture for a period sufficient to allow formation of a metal-magnesium silicate complex; and separating said complex from the effluent, said magnesium silicate being characterized by:

Mole Ratio $SiO_2/MgO$—1.75 to 4.50
Average Particle Size (microns)—10 to 55
Surface Area ($m^2/g$)—35 to 65
Bulk Density tamped (g/cc)—0.40 to 0.75
Weight Loss at 105° C. (%)—5 to 15
Ignition Loss (%)—10 to 30

2. A method of removing metal ions from aqueous effluents said metal ions being selected from the group consisting of monovalent lithium, sodium and potassium, divalent manganese, copper, cadmium, lead, iron, cobalt, nickel and zinc, and trivalent chromium and iron comprising the steps of adding amorphous, hydrated magnesium silicate while adjusting or maintaining the pH in a region that promotes the formation of an insoluble metal-magnesium silicate complex, to the agitating effluent; agitating the effluent-magnesium silicate mixture for a period sufficient to allow formation of an insoluble metal-magnesium silicate complex, and separating said complex from the effluent, said magnesium silicate being characterized by:

Mole Ratio $SiO_2/MgO$—1.75 to 4.50
Average Particle Size (microns)—10 to 55
Surface Area ($m^2/g$)—35 to 65
Bulk Density tamped (g/cc)—0.40 to 0.75
Weight Loss at 105° C. (%)—5 to 15
Ignition Loss (%)—10 to 30

3. The method of either of claims 1 or 2 wherein 0.5 to 2.0 parts by weight of magnesium silicate are used for each 1.0 part by weight of metal ion calculated as the metal oxide.

4. The method of either of claims 1 or 2 wherein 0.1 to 5.0% by weight of magnesium silicate based on the weight of the effluent containing up to 1000 ppm of metal ion is used to complex the metal ions.

5. The method of either of claims 1 and 2 wherein the effluent-magnesium silicate mixture is agitated for 5 minutes or more before separation.

6. The method of either of claims 1 or 2 wherein the pH is adjusted and/or maintained between 2.5 and 11.0.

7. The method of either of claims 1 or 2 wherein the effluent is heated to a temperature above ambient conditions but below about 80° C. during formation of the complex.

8. A method of removing metal ions from aqueous effluents comprising the steps of adding 0.1 to 5.0% by weight of hydrated magnesium silicate to said aqueous effluent while adjusting and/or maintaining the pH of the effluent-silicate mixture between 2.5 and 11.0; agitating the effluent magnesium silicate mixture for 5 minutes or more allowing the metal-magnesium silicate complex to form; and separating the complex from the effluent, said magnesium silicate being characterized by:

Mole Ratio $SiO_2/MgO$—1.75 to 4.50
Average Particle Size (microns)—10 to 55
Surface Area ($m^2/g$)—35 to 65
Bulk Density tamped (g/cc)—0.40 to 0.75
Weight Loss at 105° C. (%)—5 to 15
Ignition Loss (%)—10 to 30

9. A method of removing metal ions from aqueous effluents said metal ions being selected from the group consisting of monovalent lithium, sodium and potassium, divalent manganese, copper, cadmium, lead, iron, cobalt, nickel and zinc, and trivalent chromium and iron comprising the steps of adding 0.1 to 5% by weight of hydrated magnesium silicate to said effluent while adjusting and/or maintaining the pH of the effluent-silicate mixture between 2.5 and 11.0; agitating the effluent-silicate mixture for 5 minutes or more allowing the metal-magnesium silicate complex to form; and separating the complex from the effluent, said magnesium silicate being characterized by:

Mole Ratio $SiO_2/MgO$—1.75 to 4.50
Average Particle Size (microns)—10 to 55
Surface Area ($m^2/g$)—35 to 65
Bulk Density tamped (g/cc)—0.40 to 0.75
Weight Loss at 105° C. (%)—5 to 15
Ignition Loss (%)—10 to 30

10. The method of either of claims 8 or 9 wherein the effluent is heated to a temperature above ambient conditions but below about 80° C. during formation of the complex.

11. The method of removing trivalent chromium ions from tannery effluent by the steps of adding amorphous, hydrated magnesium silicate and adjusting or maintaining the pH at 5.3 to 9.8 to agitating tannery effluent, agitating the effluent-magnesium silicate mixture for a period sufficient to allow complexing of the chromium ions and separating the magnesium silicate from the effluent, said magnesium silicate being characterized by:

Mole Ratio $SiO_2/MgO$—1.75 to 4.50
Average Particle Size (microns)—10 to 55
Surface Area ($m^2/g$)—35 to 65
Bulk Density Tamped (g/cc)—0.40 to 0.75
Weight Loss at 105° C. (%)—5 to 15
Ignition Loss (%)—10 to 30

12. The method of claim 11 wherein the pH is adjusted and maintained at 6.5 to 8.5.

13. The method of claim 11 wherein 0.2 to 0.6% by weight of magnesium silicate based on the weight of the effluent is used to complex the trivalent chromium ion.

14. A method of removing 90% or more of the chromium from tanning effluent comprising the steps of:
(a) agitating tanning effluent containing trivalent chromium ion;
(b) adding to said agitating effluent 0.2 to 0.6% by weight of amorphous magnesium silicate characterized by:
  Mole Ratio ($SiO_2/MgO$)—1.75 to 3.25
  Average Particle Size (microns)—10 to 55
  Surface area ($m^2/g$)—35 to 65
  Bulk Density tamped (g/cc)—0.40 to 0.75
  Weight Loss at 105° C. (%)—9 to 15
  Ignition Loss (%)—17 to 30
(c) adjusting the pH of the effluent-magnesium silicate suspension to a value between 5.3 and 9.8;
(d) agitating the suspension for a time sufficient to allow complexing of the chromium ion; and
(e) separating the complexed magnesium silicate from the effluent.

15. The process of claim 14 wherein the pH is adjusted to a value between 6.5 and 8.5.

16. The process of claim 14 wherein the suspension of magnesium silicate in effluent is mixed for 1 to 10 minutes.

* * * * *